United States Patent Office 3,499,275
Patented Mar. 10, 1970

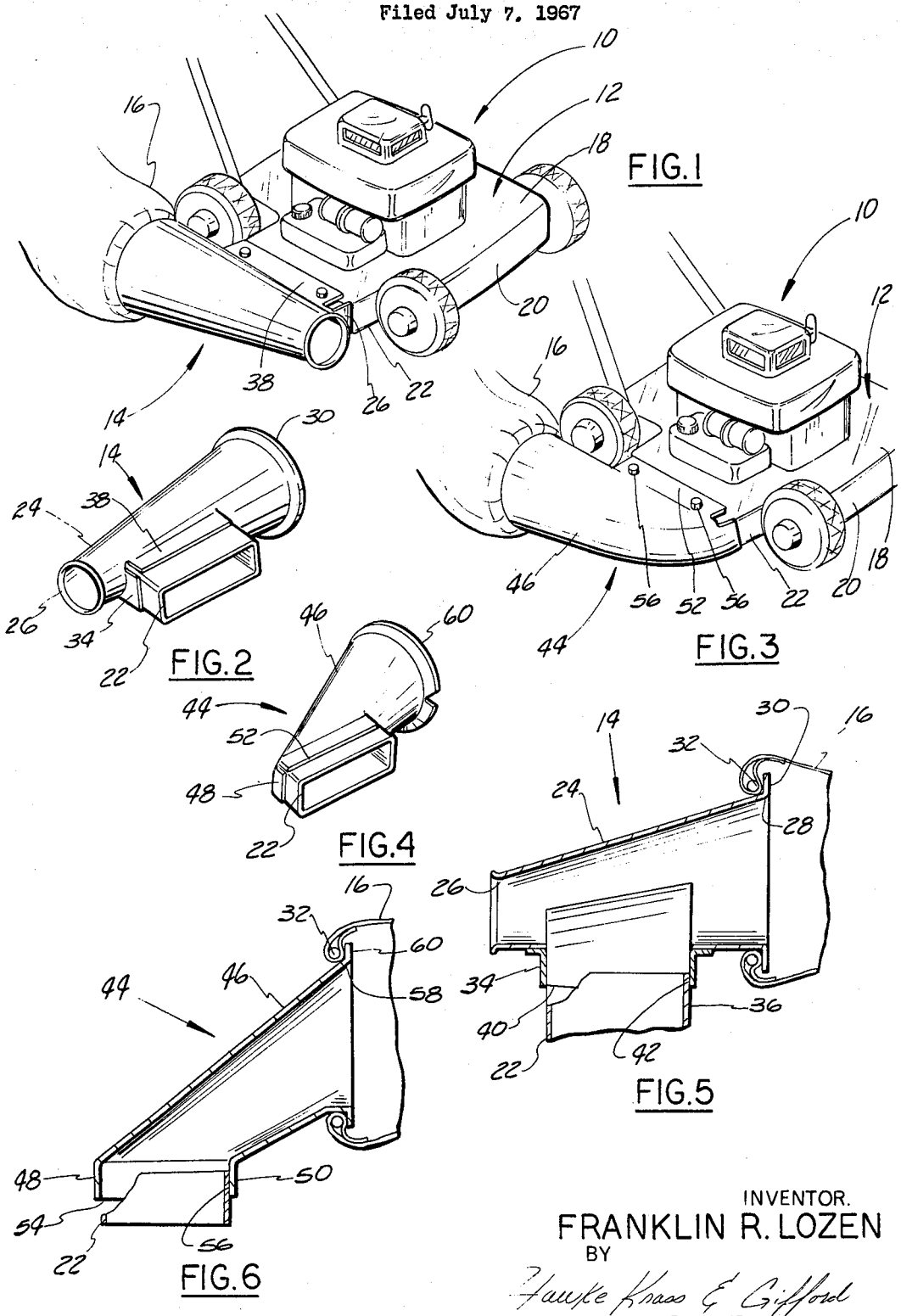

3,499,275
GRASS CATCHER FOR LAWN MOWER
Franklin R. Lozen, 29155 Tawas,
Madison Heights, Mich. 48071
Filed July 7, 1967, Ser. No. 651,909
Int. Cl. A01d 35/22
U.S. Cl. 56—202           7 Claims

ABSTRACT OF THE DISCLOSURE

A sheet metal duct attached to the cowling of a rotary power lawn mower for delivering the grass clippings from the cowling to a rearwardly supported collection bag.

One embodiment employs a generally frusto-conical duct having open ends with a forward narrow end for admitting air, a rearward wide end for discharging the clippings to the collection bag and a lateral opening intermediate the forward and rear openings attached to the discharge opening of the power mower for receiving the clippings into the duct.

Another embodiment of the invention has a generally conical configuration with a rearwardly facing exhaust opening and a lateral inlet at the forward narrow end of the duct adapted for attachment to the grass discharge opening of the mower.

BACKGROUND OF THE INVENTION

Field of the invention

This invention relates to rotary lawn mowers and more particularly to a novel duct for delivering the clippings from the mower to a collection bag or other storage container disposed rearwardly of the mower.

Description of the prior art

Rotary power mowers have a cowling for housing one or more rotating cutting blades with a lateral opening in the cowling for discharging the grass clippings, leaves, twigs and the like at a substantial velocity. A collection bag is usually releasably attached to a short duct forming an extension of the grass discharge opening.

There are two important considerations in determining the particular arrangement and configuration of the discharge duct and the collection bag. First the extremely high velocity imparted to heavy articles by the rotating blades presents a safety hazard as these articles are discharged through the discharge opening. Secondly the discharge conduit must efficiently deliver the grass clippings from the cowling to the bag collection without clogging the discharge conduit. In addition the discharge conduit must be shaped so that there are no pockets for trapping the clippings and reducing the efficient flow of the clippings from the cutting area to the collection bag.

The broad purpose of the present invention is to provide a novel duct for attachment to rotary lawn mowers which provides an effective deflector for reducing the velocity of foreign articles such as stones and the like which are discharged from the cutting area of the mower and provides an improved passageway for delivering the grass clippings from the mower to the collection bag.

The preferred embodiment of the present invention, which will be subsequently described in greater detail, comprises a sheet metal duct attached to the cowling of a rotary mower and having a hollow section forming a frustum of a cone with an open narrow end forming a circular air inlet opening, an open wide end forming a circular exhaust opening and flange means forming an open mouth between the air inlet and the exhaust opening for receiving grass clippings into the conical section. The duct is mounted to the cowling of the mower with the open mouth registering with a lateral discharge opening in the cowling. The air inlet is arranged forwardly of the open mouth with the exhaust opening facing rearwardly. Preferably the lowermost flange defining the mouth is formed tangentially to the lower side of the duct with the lower side being supported parallel to the ground.

The grass clippings are discharged from the mower cowling and received through the open mouth of the duct. The velocity of the clippings and other material discharged from the mower is then reduced as they impact against the outer sidewall of the duct and are deflected rearwardly through the exhaust opening into a collection bag. The air inlet ensures a positive continuously moving current of air for delivering the grass clippings through the exhaust end of the duct. In addition the conical configuration of the duct provides a streamlined passage without any obstructions reducing the smooth flow of material from the mower to the collection bag.

Another embodiment of the invention, also having an exhaust section formed of sheet metal into a truncated cone, has a grass receiving mouth formed at the narrow end of the cone with the wide open end forming a rearwardly directed circular exhaust opening. Like the preferred embodiment, the flanges forming the mouth of the duct include a bottom flange which is tangential to the bottom element of the conical section. Preferably the exhaust opening is formed in a plane which is vertical to the bottom element of the conical section and generally parallel to the direction the grass is received through the mouth.

It is therefore an object of the present invention to provide an improved duct for delivering the grass clippings from the discharge opening of a rotary power mower which forms a deflector for reducing the velocity of material discharged at a high velocity from the mower and which does not impair the efficient movement of the grass clippings from the cutting area of the mower.

It is another object of the present invention to provide an attachment for delivering the grass clippings from a rotary power mower to a collection bag which takes the form of a frusto-conical duct open at opposite ends with a forward narrow end forming a circular air inlet and a rearward large end forming a circular exhaust opening and a mouth for receiving grass clippings intermediate the narrow and large ends along an axis generally parallel to a plane containing the exhaust opening and deflecting them rearwardly through the exhaust opening to a collection bag.

It is another object of the present invention to provide a novel duct attached to the grass discharge opening of a rotary power mower for delivering the grass clippings from the mower to a collection bag, the duct having a generally conical configuration with a mouth for receiving the clippings formed at the forward narrow end of the cone and the large end of the duct defining an exhaust opening for discharging the clippings from the duct.

Still further object and advantages of the present invention will readily occur to one skilled in the art to which the invention pertains upon reference to the following detailed description.

DESCRIPTION OF THE DRAWING

The description refers to the accompanying drawing in which like reference characters refer to like parts throughout the several views in which:

FIGURE 1 is a perspective view of a rotary power mower and a duct illustrating the preferred embodiment of the invention attached to the cowling of the mower for delivering grass clippings to a rearward collection bag;

FIGURE 2 is a perspective view of the duct of FIGURE 1 separated from the collection bag and with a fragmentary view of the discharge conduit of the power mower;

FIGURE 3 is a perspective view of a rotary power mower with a duct illustrating another embodiment of the invention for delivering the clippings from the cowling of the mower to a rearwardly supported collection bag.

FIGURE 4 is a perspective view of the duct of FIGURE 3 separated from the collection bag and with a fragmentary view of the grass discharge conduit of the mower;

FIGURE 5 is a generally horizontal longitudinal sectional view of the duct of FIGURE 1; and FIGURE 6 is a generally horizontal longitudinal sectional view of the duct of FIGURE 3.

DESCRIPTION OF THE PREFERRED EMBODIMENTS

Now referring to the drawings, FIGURE 1 illustrates a rotary power mower 10 which is intended to be propelled by an operator (not shown) who pushes the mower along a predetermined path over the ground in the well known manner. However, it is to be understood that the preferred embodiment of the invention can be employed on rotary mowers of the riding type and the like. The mower 10 has a cowling 12 for housing a cutting blade (not shown) which is rotated about a vertical axis at a predetermined height over the ground to cut the grass. The grass clippings are delivered from the cowling 12 through a duct generally indicated at 14 to a collection bag 16.

The cowling 12 has a deck 18 for mounting an engine and a peripheral, downwardly depending side 20 which merges into a conduit 22 forming a clipping discharge opening which is best seen in FIGURE 2. Conventional rotary motors of this type have internally supported vanes (not shown) or other means to provide an involute passageway for the grass clippings which terminates with the discharge openings. The discharge conduit 22 is formed so that the clippings are delivered in a lateral direction relative to the movement of the mower 10 as it traverses the lawn. Thus objects such as stones, pieces of glass and the like which are struck by the rotating cutting blade are not propelled rearwardly toward the operator without having their velocity impeded by some form of deflector means.

Referring to FIGURES 2 and 5, the duct 14 preferably comprises a sheet metal, frusto-conical section 24 having an open narrow forward end defining a circular air inlet 26 and a rearward large end defining a circular exhaust opening 28. The forward opening 18 is preferably slightly flared and the exhaust opening 28 terminates in a peripheral lip 30 to provide means for releasably attaching the collection bag 16 by a retainer element 32.

A pair of side flanges 34 and 36, an upper flange 38 and a lower flange 40 (best illustrated in FIGURE 5) carried by the section 24 define a substantially rectangular mouth 42 between the air inlet 26 and the exhaust opening 28. The flanges defining the mouth 42 are adapted for attachment to the discharge conduit 22 so that the mouth 42 receives the clippings discharged from the cowling 12. The lower flange 42 is preferably formed tangentially to the bottom side of the frusto-conical section 24. The air inlet 26 and exhaust opening 28 are formed in parallel planes which are perpendicular to both the bottom side of the section 24 and the vertical side of the section 24 associated with the mouth 42.

The duct 14 is preferably mounted with the bottom side of the frusto-conical section being supported parallel to the ground.

The grass clipping are discharged from the cowling 12 and into the mouth 42. The clippings then are deflected by the outer sidewall of the frusto-conical section 24 rearwardly through the exhaust opening 28 and into the collection bag 16. The air inlet 26 provides a continuously flowing air current which assists in delivering the grass clippings into the collection bag 16.

Now referring to FIGURES 3, 4 and 6, a duct 44 illustrating another embodiment of the invention and preferably fabricated from a single sheet of metal provides means for delivering the grass clippings from the rotary mower 10 to the collection bag 16. The duct 44 has an exhaust section 46 with a generally truncated conical configuration. A pair of side flanges 48 and 50, an upper flange 52 and a lower flange 54 define an inlet mouth 56 at the narrow forward end exhaust section 46. The flanges 48, 50, 52 and 54 provide means for attaching the duct 44 to the discharge conduit 22 of the mower 10 and may have rivet means 56 or other fastening means to provide a rigid connection between the duct 44 and the cowl 16. Like the duct 14, the lower flange 54 defining the mouth 50 is preferably formed substantially tangential to the lower surface of the conical section 46 with the side flanges 48 and 50 and the upper flange 52 having a configuration generally dictated by the shape of the discharge conduit 22 of the mower.

The conical exhaust section 46 terminates rearwardly in a circular exhaust opening 58 which is formed in a plane substantially at right angles to a plane containing the inlet of the mouth 56 and to the bottom of the section 46. The conical section 46 has a peripheral lip 60 providing means for releasably attaching the collection bag 16 by the retainer member 32.

The clippings and other material received through the inlet mouth 56 are deflected against the outer sidewall of the conical section 46 thereby substantially reducing the velocity of stones and the like before they are exhausted into the collection bag 16. The gradually enlarged passageway defined by the exhaust section 46 in the direction of movement of the clippings ensures a positive and efficient flow of clippings from the cowling 12 and into the collection bag 16.

Although I have described but two embodiments of my invention, it is to be understood that various changes and revisions can be made therein without departing from the spirit of the invention as expressed in the scope of the appended claims.

Having described my invention, I claim:

1. A deflecting duct adapted to be attached to a rotary lawn mower or the like for receiving and directing grass clippings or the like, said duct comprising: an elongated section having first and second ends and a generally circular cross section in any transverse plane therealong, said elongated section being frusto-conical with said first end thereof being larger than said second end thereof, said elongated section having an exhaust opening at said first end thereof, flange means extending laterally from said elongated section intermediate said ends thereof for defining a lateral opening for receiving the grass clippings or the like, said flange means being offset from said frusto-conical duct, whereby clippings received therein will impinge upon the frusto-conical duct and have a circular motion imparted thereto.

2. A deflecting duct as set forth in claim 1 wherein said lateral opening is tangent to said elongated section at the intersection therebetween.

3. A deflecting duct as set forth in claim 2 wherein said elongated section has an inlet opening at said second end thereof for the admission of air.

4. A deflecting duct as set forth in claim 3 wherein said exhaust and inlet openings are disposed in parallel planes.

5. A deflecting duct as set forth in claim 4 wherein said planes are disposed at an acute angle relative to the central axis of said elongated section.

6. A deflecting duct as set forth in claim 5 wherein said elongated section is a frustum of a cone and said planes are perpendicular to a line element of said frustum which is disposed on the side having said lateral opening.

7. A deflecting duct as set forth in claim 1 wherein said elongated section has an inlet opening at said second end thereof for the admission of air.

References Cited
UNITED STATES PATENTS

| | | | |
|---|---|---|---|
| 2,495,032 | 1/1950 | Stuhl | 56—255 X |
| 2,747,356 | 5/1956 | Peterson | 56—202 |
| 3,099,123 | 7/1963 | Price | 56—202 |
| 3,132,457 | 5/1964 | Slemmons | 56—202 |
| 3,143,842 | 8/1964 | Mattson et al. | 56—202 |

ANTONIO F. GUIDA, Primary Examiner